(12) United States Patent
Okada

(10) Patent No.: US 7,309,172 B2
(45) Date of Patent: Dec. 18, 2007

(54) OPTICAL MODULE

(75) Inventor: Takeshi Okada, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/510,461

(22) Filed: Aug. 24, 2006

(65) Prior Publication Data

US 2007/0047880 A1 Mar. 1, 2007

(30) Foreign Application Priority Data

Aug. 25, 2005 (JP) ............................ 2005-243580

(51) Int. Cl.
*G02B 6/36* (2006.01)
(52) U.S. Cl. .......................... 385/89; 385/92
(58) Field of Classification Search .................. 385/89, 385/92
See application file for complete search history.

(56) References Cited

U.S. PATENT DOCUMENTS

| | | | | |
|---|---|---|---|---|
| 5,408,559 A | * | 4/1995 | Takahashi et al. | ............ 385/89 |
| 5,838,859 A | * | 11/1998 | Butrie et al. | ................. 385/92 |
| 5,867,622 A | * | 2/1999 | Miyasaka et al. | ............. 385/88 |
| 6,106,160 A | * | 8/2000 | Kikuchi et al. | ............... 385/88 |
| 2006/0140546 A1 | * | 6/2006 | Nakata et al. | ................ 385/88 |
| 2007/0009199 A1 | * | 1/2007 | Yokino et al. | ................ 385/14 |

FOREIGN PATENT DOCUMENTS

JP 2004-012647 1/2004

* cited by examiner

*Primary Examiner*—Ellen E. Kim
(74) *Attorney, Agent, or Firm*—Fish & Richardson P.C.

(57) ABSTRACT

An optical transmitter-receiver module has a structure in which a light-emitting device and a light-receiving device are coupled with an optical fiber through a wavelength-selecting filter. In the above structure, part of the lightwave of the light-emitting device is reflected from the wavelength-selecting filter, is reflected again from a wall in the opposite direction, and enters the light-receiving device, causing optical crosstalk between the light-emitting device and the light-receiving device. An object of the invention is to prevent the crosstalk between the light-emitting device and the light-receiving device. An inverted conical hole is provided in a wall at which the lightwave of the light-emitting device arrives after it is reflected from the wavelength selecting filter. The hole has a size larger than the spread of the reflected lightwave of the light-emitting device. The hole has a vertical angle of 72 to 80 degrees or 100 to 160 degrees.

18 Claims, 8 Drawing Sheets

OPTICAL MODULE

BACKGROUND OF THE INVENTION

1. Field of the Invention

The present invention relates to an optical transmitter-receiver module having a three-dimensional structure in which a light-emitting device and a light-receiving device are housed together in a metallic package. The present invention intends to offer a device structure that reduces optical crosstalk between the light-emitting device and the light-receiving device. Here, the term "crosstalk" is used to mean that part of the signal of the light-emitting device intrudes into the light-receiving device in the same node. The crosstalk is classified into electrical crosstalk, electromagnetic crosstalk, and optical crosstalk. Here, the present invention tackles a problem of optical crosstalk that causes noise due to the intrusion of the lightwave of the light-emitting device into the light-receiving device.

2. Description of the Background Art

At present, a metallic can package-type optical transmitter-receiver module has the following structure. A light-receiving device is housed in a metallic can package, and a light-emitting device is housed in another metallic can package. Two optical fibers connected to the individual packages are connected to a wavelength-demultiplexing-and-multiplexing device (WDM). The WDM is further connected to an optical fiber. In this case, the light-receiving device (PD, APD) and the light-emitting device (LD, LED) are housed in the independent packages and connected through an optical fiber. Therefore, there is no possibility of occurring optical crosstalk.

A metallic can package type having a three-dimensional structure has been developed. This package has the following structure. A wavelength-selecting filter is provided right before an optical fiber. The outgoing signal lightwave of a light-emitting device passes through the wavelength-selecting filter in a straight line to enter the optical fiber. The incoming signal lightwave having travelled over the optical fiber is reflected from the wavelength-selecting filter to enter the light-receiving device. This three-dimensional structure houses the light-receiving device and the light-emitting device in a metallic can package. The reason this type is developed is that it has excellent air-tightness and therefore high reliability.

In this case, if a surface extending in a direction of the axis exists at the side of the wavelength-selecting filter, there is a possibility that a lightwave reflected from the wavelength-selecting filter is again reflected from that surface to enter the light-receiving device.

Such a possibility is explained below by referring to FIG. 1. An outgoing signal lightwave (solid line) generated by a light-emitting device (hereinafter simply referred to as LD) 3 is condensed by a lens 4, passes through a wavelength-selecting filter 5 obliquely, and arrives at the end of an optical fiber 6. The outgoing signal lightwave enters the optical fiber to travel over it. In front of the wavelength-selecting filter 5, a lens 7 and a light-receiving device (hereinafter simply referred to as PD) 8 are provided. An incoming signal lightwave (broken line) having travelled over the optical fiber 6 is reflected from the wavelength-selecting filter 5, bends its optical pathway about 90 degrees, is condensed by the lens 7, and enters the PD 8. With respect to the wavelength-selecting filter 5, at the opposite side of the PD 8, some wall 9 sometimes exists. In this case, a problem will be created.

The wavelength-selecting filter 5 is designed to transmit almost all, not completely all, of the lightwave of the LD, which enters the filter 5 at an angle of 45 degrees. The increase in the transmittance to a value close to 100% requires an increase in the number of layers in the dielectric multilayer film. This results in a cost increase. Consequently, a dielectric multilayer filter must be used in which the number of layers is limited to a certain extent. As a result, the filter cannot transmit all of the 45-degree-incident lightwave from the LD. Therefore, part of the outgoing signal lightwave from the LD 3 is reflected from the wavelength-selecting filter 5. In other words, part of the lightwave from the LD is reflected and bends its optical pathway about 90 degrees. The reflected lightwave hits the wall 9 to be reflected again directly. It returns the same pathway, arrives at the wavelength-selecting filter 5, and passes through it at a transmittance close to 100%. Subsequently, it passes through the lens 7 and arrives at the PD 8. In other words, when the wall 9 exists at the behind of the wavelength-selecting filter 5, part of the lightwave from the LD 3 enters the PD 8, causing optical crosstalk.

When crosstalk occurs between the light-emitting device and the light-receiving device in a module, the signal-to-noise ratio of the received signal lightwave decreases considerably. Such a module is not suitable as an optical module for optical communication. It is necessary to prevent the outgoing signal lightwave of the light-emitting device from entering the light-receiving device. Although having variations, the optical crosstalk amounts to −40 to −30 dB or so due to the imperfectness of the wavelength-selecting filter 5 and the existence of the wall 9. Depending on the purpose, it may be insufficient. For example, the crosstalk is sometimes required to be suppressed to −47 to −50 dB or below.

For example, it is assumed that an optical transmitter-receiver module as shown in FIG. 2 is produced. A package 20 of an LD comprises a cylindrical surface 23, a lens-supporting face 24, and a bottom face 25 and consequently has an internal space 22. An LD chip 3 is fixed in the internal space 22. Actually, a stem has a bump to which the LD chip 3 is fixed. Nevertheless, such an internal structure is omitted in FIG. 2. The LD chip 3, the package 20, and the like constitute the LD as a whole.

A package 30 of a PD comprises a cylindrical surface 33, a lens-supporting face 34, and a bottom face 35 and consequently has an internal space 32. A PD chip 8 is fixed in the internal space 32. The PD chip 8 and the package 30 constitute the PD as a whole. Although not shown, lead pins protrude from the back of the packages of the LD and PD.

A filter-holding sleeve 40 is provided to hold a wavelength-selecting filter 5. The filter-holding sleeve 40 has the shape of, for example, a rectangular solid. It comprises a bottom face 42, a left-hand-side face 43, an upper face 44, a right-hand-side face 45, and the like. The left-hand-side face 43 is also a side face of a left block 46. The right-hand-side face 45 is also a side face of a right block 47. A slanted face 48 extends upward obliquely from the left block 46 and connects to a slanted face 49 of the right block 47. The slant angle Ψ of the slanted faces 48 and 49 is close to 45 degrees. Nevertheless, it may deviate from the 45 degrees to a small extent. It is essential only that the position of the PD be properly determined by the slant angle Ψ. An opening 50 is provided between the slanted faces 48 and 49, and the wavelength-selecting filter 5 is fixed there. The wavelength-selecting filter 5 is a dielectric multilayer filter designed such that when the incoming signal lightwave (e.g., 1.55 μm) enters it at an angle of 45 degrees, it reflects the lightwave, and when the outgoing signal lightwave (e.g., 1.3 μm) enters it at an angle of 45 degrees, it transmits the lightwave.

The end portion of an optical fiber 6 is fixed at an opening 52 at the center of the upper face 44 of the sleeve 40. Another opening 53 is provided at the upper portion of the left-hand side face 43 of the sleeve 40 to fix the package 30 of the PD. Thus, the LD and PD housed in the package are fixed to the filter-holding sleeve 40. The optical axis of the optical fiber lies on an extension of the optical axis of the LD. When the optical axis of the PD is shifted line-symmetrically with respect to the wavelength-selecting filter 5 as the center, the shifted optical axis lies on an extension of the optical axis of the optical fiber.

The sleeve 40 holding the wavelength-selecting filter 5 has solid blocks 46 and 47 at its bottom half. The inner side face of the right-hand block 47 forms a wall 9 facing the wavelength-selecting filter 5 at a short distance.

Most of the outgoing signal lightwave emitted from the LD 3 passes through the wavelength-selecting filter 5, advances in a straight line, and enters the optical fiber 6. However, it is difficult to produce the wavelength-selecting filter 5 having a 100% transmittance for the lightwave of the LD. Because of the imperfectness of the wavelength-selecting filter 5, part of the lightwave of the LD is reflected and arrives at the wall 9. The wall 9 has a smooth face and reflects the lightwave of the LD to the opposite direction. Almost 100% of the reflected lightwave passes through the wavelength-selecting filter 5. Then, the lightwave is condensed by a lens 7, and enters the PD 8. In other words, part of the outgoing signal lightwave of the LD 3 enters the PD 8. The reflection from the wall 9 is close to 100%, and the lightwave passes through the wavelength-selecting filter 5 almost 100%. Therefore, the power of the outgoing signal lightwave entering the PD depends almost on the performance of the wavelength-selecting filter 5. Such a structure creates a crosstalk of −30 to −40 dB.

If another wavelength filter (WDM) that reflects the wavelength of the outgoing signal lightwave and transmits the wavelength of the incoming signal lightwave is placed on an optical pathway 54 connecting the wavelength-selecting filter 5 and the lens 7, the crosstalk can be decreased. However, this structure further requires a high-cost WDM, increasing the cost of the module.

The present inventor found Patent literature 1 that raises a problem of crosstalk between the LD and PD. The optical module discussed in Patent literature 1 has a structure in which a PD is formed by housing a PD chip in a metallic can package, and an LD is formed by housing an LD chip in another metallic can package. The PD and LD are fixed on two side faces of a frame body for housing a wavelength-selecting filter. The PD and LD are coupled with a single optical fiber.

Patent literature 1: the published Japanese patent application Tokukai 2004-012647.

In Patent literature 1, the optical module has a structure in which an LD and a PD are coupled with an optical fiber through a wavelength-selecting filter. Patent literature 1 has proposed the following three methods: (a) a side wall of the filter-housing body is provided with a hole, (b) a side wall is formed with a face giving diffused reflection, and (c) a side wall is coated with frosting paint. According to the literature, although the lightwave from the LD is reflected from the wavelength-multiplexing-and-demultiplexing filter, the reflected lightwave passes through the through hole formed in the side wall of the filter-housing body to exit to the outside without entering the PD. The literature emphasizes that this structure should be able to eliminate the PD noise.

The literature states that when the side wall of the filter-housing body is formed with a face giving diffused reflection, the reflected lightwave from the LD is further reflected diffusedly there. Consequently, the lightwave arriving at the PD should be decreased, according to the literature. Alternatively, the literature describes when the side wall of the filter-housing body is coated with frosting paint, the reflected lightwave from the LD is absorbed and does not enter the PD. In short, the literature intends to decrease the reflected lightwave with the through hole, surface roughening, or painting.

All of the measures proposed by Patent literature 1 are imperfect. The idea of providing a through hole in the side wall in order to eliminate the reflection is not desirable because part of the outgoing signal lightwave leaks to the outside. The outgoing signal lightwave having exited to the outside from the through hole has a possibility of returning after being reflected again. In addition, stray lightwaves at the outside may enter the PD. The external environment may affect considerably. That is also undesirable.

Patent literature 1 proposes another method of applying frosting paint. However, it cannot be said that frosting paint absorbs the lightwave completely. Some of the lightwave may be reflected to enter the PD. The method must be said imperfect. Patent literature 1 proposes yet another method of roughening the side wall to reflect the lightwave diffusedly. The diffused reflection may sound a good idea. Nevertheless, some of the lightwave may enter the PD, and the chance of the entrance must be treated by probability. Therefore, the method must be said imperfect.

SUMMARY OF THE INVENTION

The present invention relates to an optical module having a structure in which an LD and a PD are coupled with an optical fiber through a wavelength-selecting filter. An object of the present invention is to offer a structure in which part of the lightwave of the LD is more perfectly prevented from entering the PD after the lightwave of the LD is reflected from the wavelength-selecting filter and the reflected lightwave is further reflected from the side wall.

The present invention achieves the foregoing object by boring an inverted circular conical hole, an inverted pyramid-shaped hole, or a groove-shaped hole each having the following features. The hole is bored in a side wall at which part of the lightwave of the light-emitting device arrives after it is reflected from the wavelength-multiplexing-and-demultiplexing (-selecting) filter. The hole has a size larger than the spread of the reflected lightwave having arrived at the hole. The hole has a vertical angle of 100 to 160 degrees or 72 to 80 degrees. The inverted circular conical hole, the inverted pyramid-shaped hole, and the groove-shaped hole are collectively referred to as an inverted conical hole. The groove-shaped hole is a hole having the shape of a groove with at least two slanted faces. The inverted conical hole (the inverted circular conical hole, the inverted pyramid-shaped hole, and the groove-shaped hole) can prevent the lightwave of the LD reflected from the wavelength-selecting filter form entering the PD after being reflected further.

FIG. 3 shows a schematic cross-sectional view of an optical transmitter-receiver module in which a side wall is provided with an inverted conical hole 60. The module has nearly the same structure as that shown in FIG. 2. An LD package 20 housing a light-emitting device 3 (LD) and a PD package 30 housing a light-receiving device 8 (PD) are fixed at two faces of a sleeve that houses a wavelength-selecting filter 5. The above structure is the same as in FIG. 2. The wavelength-selecting filter 5 is fixed at an opening 50 of slanted faces 48 and 49 in the sleeve. This structure is also the same. The incoming signal lightwave from the optical fiber 6 is reflected from the wavelength-selecting filter 5, is condensed by a lens 7, and enters the light-receiving device 8. The outgoing signal lightwave from the light-emitting device 3 is condensed by a lens 4, passes through the wavelength-selecting filter 5, and enters the end face of the optical fiber 6. Such a function is also the same.

A different aspect is that the inverted conical hole 60 is bored in a side wall of the sleeve's cavity through which the lightwave of the light-emitting device passes. The inverted conical hole 60 functions to prevent the lightwave of the light-emitting device (LD) from entering the light-receiving device 8 even when it is reflected from the wavelength-selecting filter 5. The lightwave emitted from the light-emitting device (LD) 3 is spreading. Even when it is spreading, the lens 4 condenses it at the end face of the optical fiber 6. For example, a light ray 72 at the right-hand side is reflected from the wavelength-selecting filter 5 to become an incident light ray 73 to the inverted conical hole 60. It is reflected in the hole 60 to become a once-reflected light ray 74. It is further reflected in the hole 60 to become a twice-reflected light ray 75. It does not enter the lens 7 in front of the light-receiving device. It is blocked by the inner wall of the sleeve. Of the light rays emitted from the light-emitting device, the light ray 72 at the right-hand side has the maximum possibility of entering the light-receiving device. A light ray in the vicinity of the center and a light ray deviated to the left are farther dislocated and do not enter the light-receiving device. Part of a light ray 76 at the left-hand side is reflected from the wavelength-selecting filter 5 to become an incident light ray 77 to the inverted conical hole. It becomes a once-reflected light ray 78 and then a twice-reflected light ray 79. It is blocked by the wall below the wavelength-selecting filter 5. Because all of the light rays emitted from the light-emitting device lie between the light rays 72 and 76, the twice-reflected light ray 79 at the inverted conical hole 60 comes to lie below the twice-reflected light ray 75 and does not enter the light-receiving device 8. In other words, the light rays that are emitted from the light-emitting device and then reflected from the wavelength-selecting filter do not enter the light-receiving device 8 at all. As a result, the crosstalk between the light-emitting device and the light-receiving device can be prevented.

The above explanation cannot be applied if the inverted conical hole has a slanted face having significant unevenness. The present inventor has found that in order to decrease the crosstalk to −47 dB or below by the presence of the inverted conical hole, it is necessary to reduce the surface roughness of the slanted face of the inverted conical hole down to Ra=0.6 μm or below. The present inventor also has found that in order to decrease the crosstalk to −59 dB or below, it is necessary to reduce the surface roughness of the slanted face down to Ra=0.2 μm or below.

According to the present invention, in the wall of the side to which the lightwave of the light-emitting device advances after being reflected from the wavelength-selecting filter, an inverted conical hole is provided that has a size larger than the spread of the reflected lightwave of the light-emitting device and that has a vertical angle, α, of 100 to 160 degrees or 72 to 80 degrees. When part of the lightwave of the light-emitting device is reflected from the wavelength-selecting filter, the reflected lightwave is further reflected twice in the inverted conical hole to return toward the wavelength-selecting filter. In this case, the travelling direction of the returning lightwave deviates from the center axis by the amount of about $2\alpha-\pi$ ($\pi$ means 180 degrees). Therefore, it does not return to the light-receiving device. When a is 100 to 160 degrees or 72 to 80 degrees, the foregoing $2\alpha-\pi$ becomes 20 to 140 degrees when expressed in degree. Because the direction deviates from the center axis by that amount, the twice-reflected lightwave does not arrive at the light-receiving device. For example, when $\alpha=120$ degrees, $2\alpha-\pi=60$ degrees. When the lightwave deviates from the center axis by this magnitude, the lightwave hits the wall of the sleeve to disappear without being able to arrive at the light-receiving device. As a result, the crosstalk between the light-emitting device and the light-receiving device can be prevented effectively.

Such a discussion can be perfectly established when the surface of the inverted conical hole is completely smooth. However, because the inverted conical hole is bored with a drill or the like, it cannot have a completely smooth surface. Its surface sometimes becomes locally uneven or roughened. Even in such a case, the surface having an Ra of 0.6 μm or below can prevent the crosstalk sufficiently. To suppress the crosstalk to −47 dB or below, the surface of the inverted conical hole is required to have a surface roughness, Ra, of 0.6 μm or below. To suppress the crosstalk to −59 dB or below, the surface is required to have an Ra of 0.2 μm or below.

EXPLANATION OF THE SIGN

3: LD chip; 4: lens; 5: wavelength-selecting filter; 6: optical fiber; 7: lens; 8: PD chip; 9: wall; 20: LD package; 22: internal space of the package; 23: cylindrical surface; 24: lens-supporting face; 25: bottom face; 30: PD package; 32: internal space of the package; 33: cylindrical surface; 34: lens-supporting face; 35: bottom face; 40: filter-holding sleeve; 42: bottom face; 43: left-hand-side face; 44: upper face; 45: right-hand-side face; 46: left block; 47: right block; 48: slanted face; 49: slanted face; 50: opening; 52: opening at the center; 53: opening; 54: optical pathway; 60: inverted conical hole; 72: light ray at the right-hand side; 73: incident light ray; 74: once-reflected light ray; 75: twice-reflected light ray; 76: light ray at the left-hand side; 77: incident light ray; 78: once-reflected light ray; 79: twice-reflected light ray; 80: light ray; 81: point; 82: primary reflection light ray; 83: point; 84: secondary reflection light ray; 85: light ray; 86: point; 87: primary reflection light ray; 88: point; 89: secondary reflection light ray; 90: light ray; 91: point; 92: primary reflection light ray; 93: light ray; 94 point; 95: primary reflection light ray; 96: point; 97: secondary reflection light ray; 98: point; 99: tertiary reflection light ray; 200: stem; 202: lead pin; 203: lead pin; 204: lead pin; 205: photodiode; 206: pole; 207: lens holder; 208: LD sleeve; 209: filter-holding sleeve; 210: isolator; 213: center hole; 220: left-side opening; 221: partition wall; 222: window; 230: stem; 231: lead pin; 232: lead pin; 233: lead pin; 234: lens holder; 240: ferrule; 242: covering; 243; ferrule holder.

DETAILED DESCRIPTION OF THE INVENTION

The shape of the inverted conical hole is not limited to circular. The hole may be an inverted pyramid-shaped hole. The inverted pyramid-shaped hole may either be a regular one or be an irregular one. A hole having the shape of a two-fold symmetrical prism may also be used. It is required only to determine that the hole can perform the reflection twice.

Figure 4:
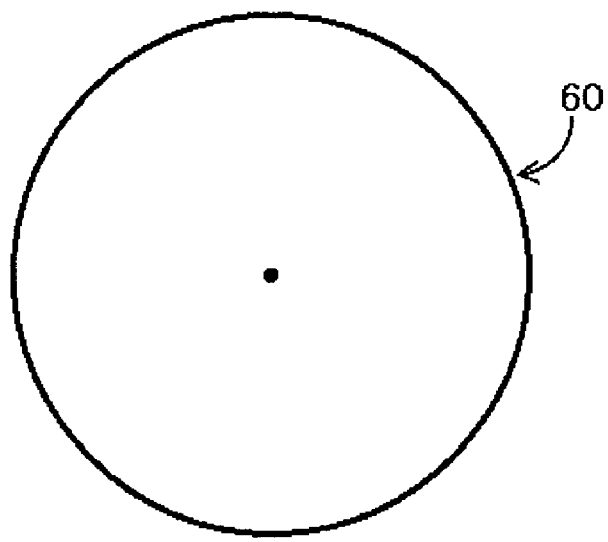
FIG. 4 is an enlarged plan view of an inverted circular conical hole when it is used as the inverted conical hole to be bored in the wall.

FIG. 4 shows a plan view of an inverted circular conical hole. Its vertical angle is 100 to 160 degrees or 72 to 80 degrees. The vertical angle of the inverted circular conical hole is defined as two times the angle formed by the center axis and the generator. The size needs only to be larger than the spread of the lightwave of the light-emitting device after it is reflected from the wavelength-selecting filter. The size and shape of the inverted circular conical hole can be specified by the foregoing conditions.

Figure 5:
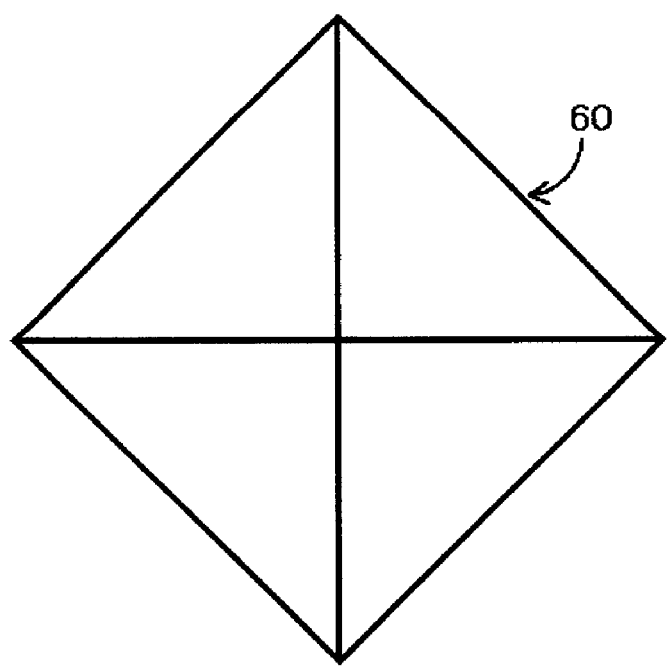
FIG. 5 is an enlarged plan view of an inverted quadrangular pyramid-shaped hole when it is used as the inverted conical hole to be bored in the wall.

FIG. 5 shows an example of an inverted quadrangular pyramid-shaped hole. The size and the magnitude of the vertical angle are determined with the same requirement as that of the inverted circular conical hole. The vertical angle of the inverted pyramid-shaped hole is defined as a summation of an angle formed by the center axis and a slanted face and another angle formed by the center axis and another slanted face opposite to the foregoing slanted face.

Similarly, the vertical angle of the groove-shaped hole is defined as a summation of an angle formed by the center axis and a slanted face and another angle formed by the center axis and another slanted face opposite to the foregoing slanted face.

Figure 6:
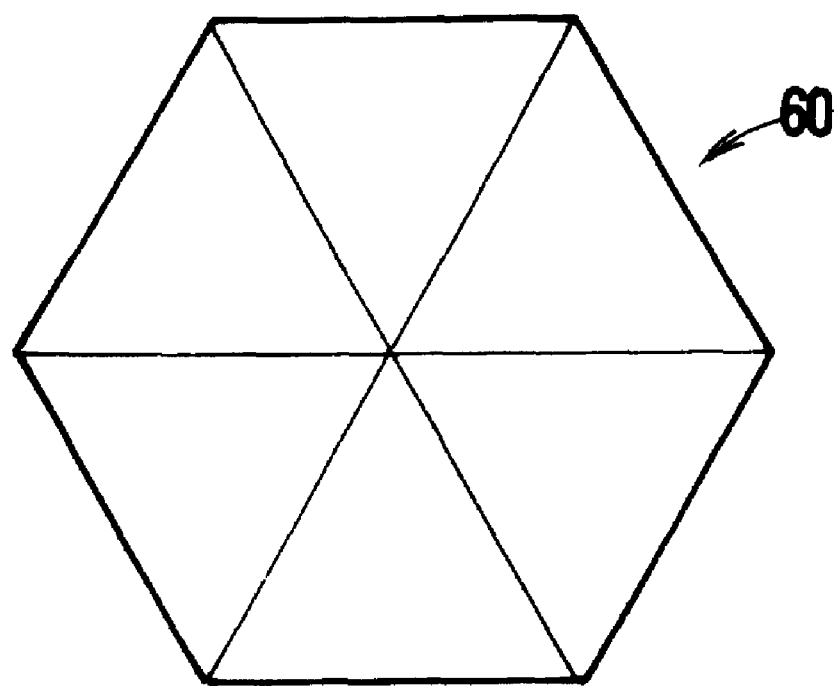
FIG. 6 is an enlarged plan view of an inverted sex angular pyramid-shaped hole when it is used as the inverted conical hole to be bored in the wall.

FIG. 6 shows an example of an inverted sex angular pyramid-shaped hole. The size and vertical angle are determined similarly. The vertical angle is 100 to 160 degrees or 72 to 80 degrees. The size is determined in a manner that it is larger than the spread of the lightwave of the light-emitting device after it is reflected from the wavelength-selecting filter.

Figure 7:
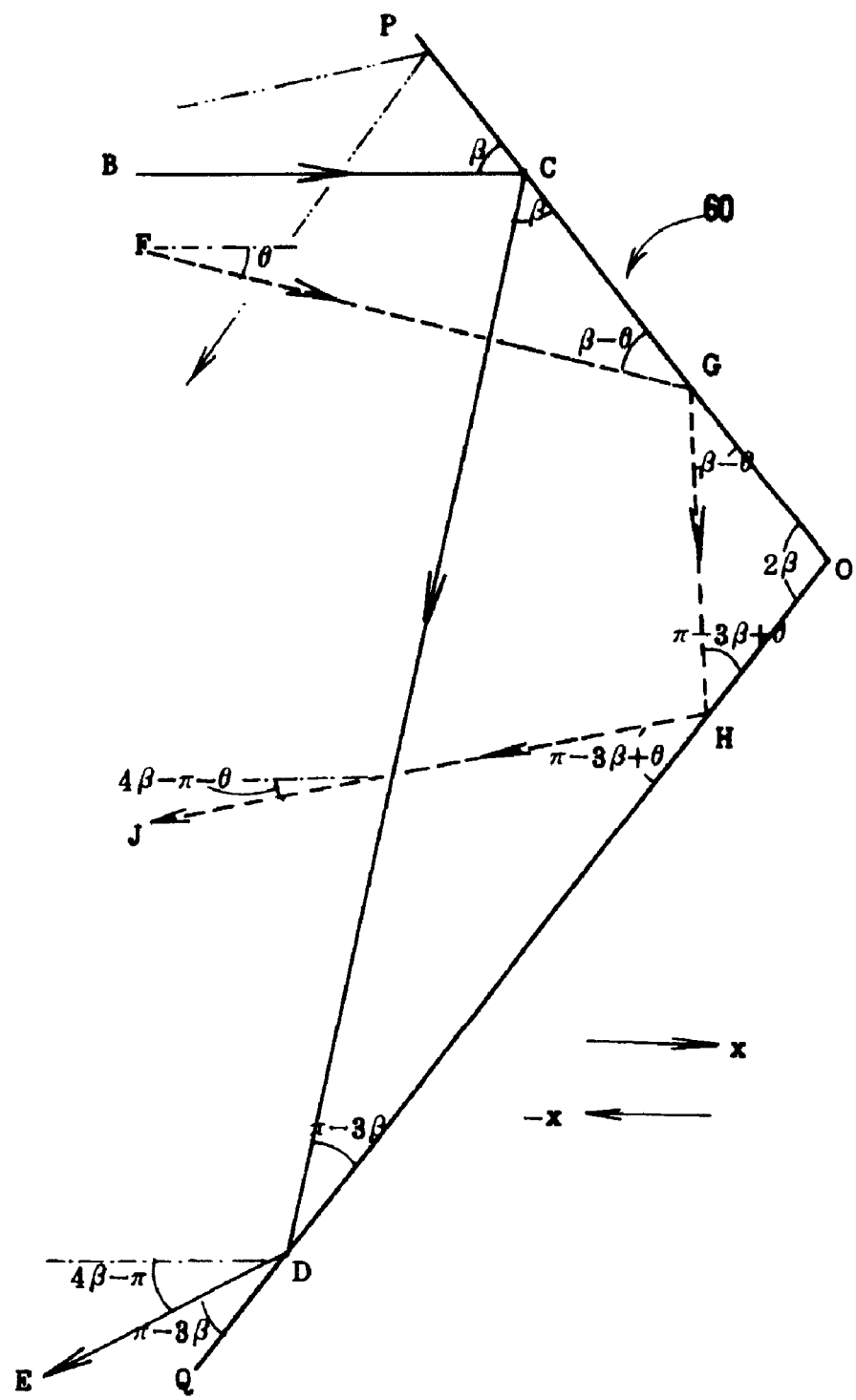
FIG. 7 is a diagram for explaining the outgoing direction of light rays of the light-emitting device reflected by the filter after they enter the inverted conical hole to be reflected there, in which a light ray along the axis is reflected twice in the inverted conical hole having a vertical angle of $\alpha$ (=$2\beta$) and exits in a direction of ($4\beta-\pi$), and similarly a light ray forming an angle of $\theta$ with the axis is reflected twice in the same hole and exits in a direction of ($4\beta-\pi-\theta$).

FIG. 7 explains the function of the inverted conical hole. When the lightwave of the light-emitting device is reflected from the filter, it advances in a direction perpendicular to the optical axis of the light-emitting device. This direction is expressed as the x-axis. The inverted circular conical hole and the inverted pyramid-shaped hole are collectively expressed simply as the "inverted conical hole." The vertical angle of the inverted conical hole is denoted as $\alpha$, and a half of it is denoted as $\beta$ ($2\beta=\alpha$, $\alpha$: vertical angle). The surface of the inverted conical hole is expressed by POQ. The center axis (axis of symmetry) of the inverted conical hole is parallel to the x-axis. A light ray BC, which is parallel to the x-axis, is taken as a representative. The light ray BC is a light lay of the LD reflected from the filter. The light ray BC will be reflected twice here. To avoid confusion, it is referred to as an incident light ray. The generator OP of the inverted conical hole and the incident light ray BC produces an angle of $\beta$. In other words, $\angle PCB=\beta$. The light ray BC is reflected from the surface OP of the inverted conical hole and produces a light ray CD, which is referred to as a once-reflected light ray. The light ray CD and the generator OC produces an angle of $\beta$. That is, $\angle OCD=\beta$. The light ray CD is reflected again from the opposite generator OQ. Because the vertical angle is $2\beta=\alpha$ and $\angle OCD=\beta$, this results in $\angle ODC=\pi-3\beta$. The light ray is reflected at a point D for the second time and exits in a direction of $\angle EDQ=\pi-3\beta$. The line OQ forms an angle of $\beta$ with the x-axis. Therefore, the outgoing light ray DE forms an angle of $4\beta-\pi$ with the $-x$-axis. The outgoing light ray returns to the original direction when $\beta=\pi/4$. Under other conditions, the twice-reflected light ray does not return to the original direction. Therefore, it does not pass through the filter and consequently does not enter the PD.

Figure 1:
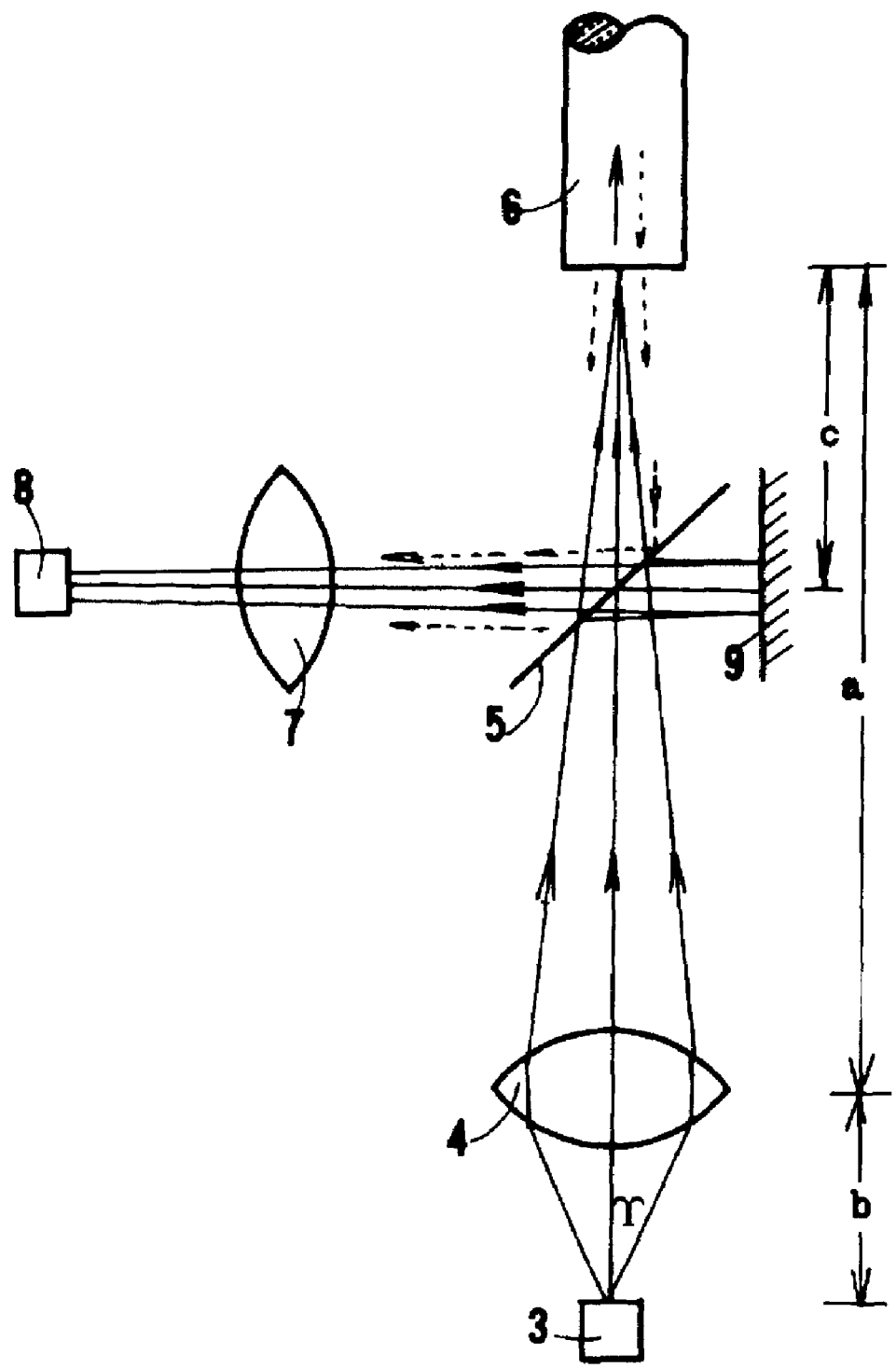
FIG. 1 is a diagram for explaining the occurrence of crosstalk between a light-emitting device and a light-receiving device in a structure in which (a) the light-emitting device and the light-receiving device are combined with an optical fiber through a wavelength-selecting filter and (b) a wall exists at a side of the wavelength-selecting filter, the crosstalk being caused such that part of the lightwave of the light-emitting device is reflected from the wavelength-selecting filter and the reflected lightwave is reflected again from the wall to enter the light-receiving device.
Figure 2:
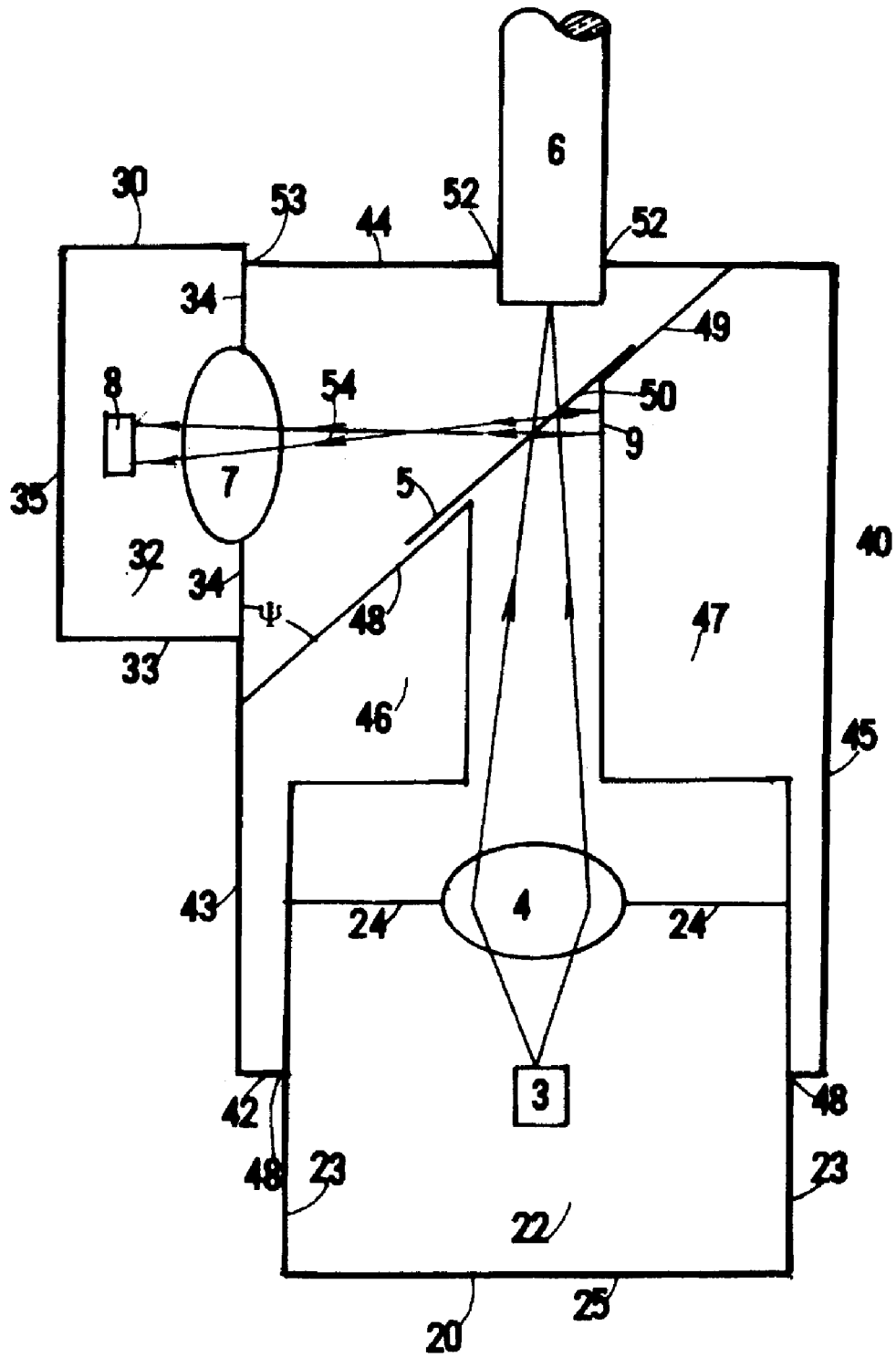
FIG. 2 is a schematic constitution diagram of an optical transmitter-receiver module for explaining the occurrence of crosstalk between a light-emitting device and a light-receiving device in a structure in which (a) a module of the light-emitting device and a module of the light-receiving device are combined with a sleeve for a wavelength-selecting filter, (b) the lightwave of the light-emitting device and the lightwave for the light-receiving device are coupled with an optical fiber through the wavelength-selecting filter, and (c) a wall exists at a side of the wavelength-selecting filter, the crosstalk being caused such that part of the lightwave of the light-emitting device is reflected from the wavelength-selecting filter and the reflected lightwave is reflected again from the wall to enter the light-receiving device.
Figure 3:
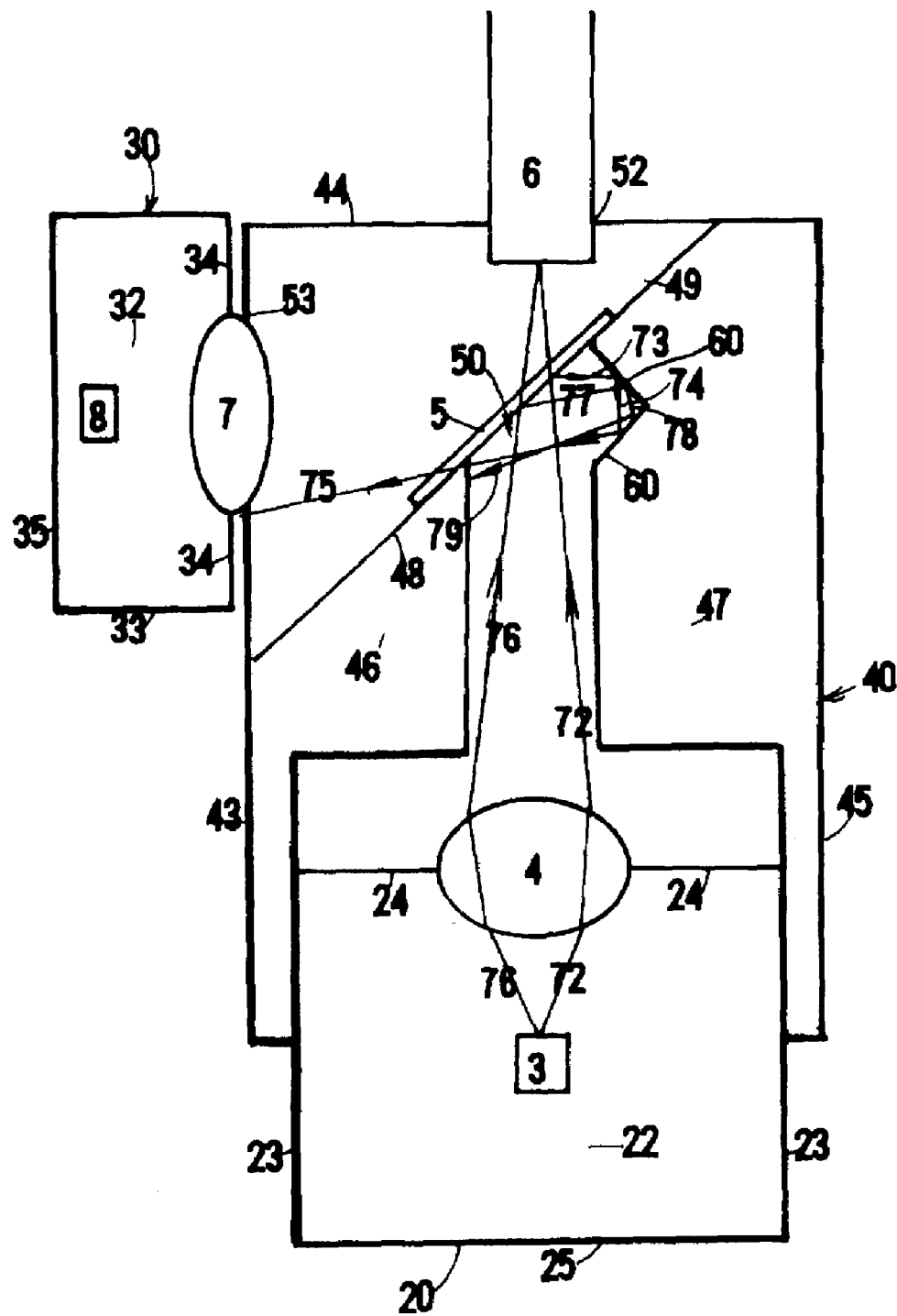
FIG. 3 is a schematic constitution diagram of an optical transmitter-receiver module for explaining the suppression of the crosstalk between a light-emitting device and a light-receiving device in a structure in which (a) a module of the light-emitting device and a module of the light-receiving device are combined with a sleeve for a wavelength-selecting filter, (b) the lightwave of the light-emitting device and the lightwave for the light-receiving device are coupled with an optical fiber through the wavelength-selecting filter, and (c) a wall exists at a side of the wavelength-selecting filter, the suppression of the crosstalk being achieved by boring an inverted conical hole in the wall so that after part of the lightwave of the light-emitting device is reflected from the wavelength-selecting filter, the reflected lightwave can be reflected twice in the inverted conical hole, preventing itself from entering the light-receiving device.

The light rays from the LD are composed of not only light rays along the optical axis but also other light rays with some spread. Let us consider a light ray of the LD emitted in a direction deviated to the right from the optical axis by $\theta/2$. When it is reflected from the filter, it becomes a light ray FG (shown by a broken line), which forms an angle of $\theta$ with the x-axis. When the light ray FG arrives at the generator OP of the inverted conical hole, the angle $\angle PGF$ becomes $\beta-\theta$. The light ray FG has an inclination larger than that of the light ray BC, which is along the optical axis, by an angle of $\theta$. When reflected from a point G, the light ray advances in a direction of $\angle OGH=\beta-\theta$. It hits the opposite generator OQ of the inverted conical hole at a point H. Consequently, the angle $\angle OHG$ becomes $\pi-3\beta+\theta$. The light ray is reflected at the point H for the second time and exits in a direction of HJ. Consequently, $\angle QHJ=\pi-3\beta+\theta$. The direction HJ forms an angle of $4\beta-\pi-\theta$ with the -x-axis. When $\theta$ is positive, the direction HJ is closer to the −x-axis than the direction DE is. The maximum value of $\theta$ depends on the spreading angle $\gamma$ of the light beam of the light-emitting device, the distance "b" between the light-emitting device and the lens, the distance "a" between the lens and the optical fiber, and so on. As can be seen from FIGS. 1 and 3, the maximum value of $\theta$ is $\gamma b/2a$. The size "m" of the spread of the lightwave of the light-emitting device at the side wall after it is reflected from the wavelength-selecting filter is "$m \leq \gamma bc/a$," where the distance between the wavelength-selecting filter and the optical fiber is denoted as "c." Therefore, when the diameter of the inverted conical hole is expressed as "d," it is essential only that "$d > \gamma bc/a$." This formula determines the lower limit of the size of the inverted conical hole.

Next, factors for determining the vertical angle of the inverted conical hole are described below. In the case of the center light ray BC, when this light ray returns along the −x-axis, it is the worst case. In this case, the condition is $4\beta-\pi=0$. Consequently, $\beta=45$ degrees. In other words, the vertical angle is 90 degrees. The condition that the vertical angle is 90 degrees is the most risky. The condition must be avoided. It is obvious.

In addition, it is essential that a light ray be reflected twice in the inverted conical hole. A three-time reflection is not allowed. If the light ray is reflected three times, the dispersion angle $\theta$ affects intensely. As a result, part of the light rays may enter the light-receiving device. In the case of the light ray BC at the center optical axis, the three-time reflection occurs when the angle "$\pi-4\beta$" formed between the light ray and the axis after the second reflection is greater than $\beta$. Because $\pi-4\beta>\beta$, this results in $\beta<36$ degrees. In other words, $\alpha$ ($=2\beta$)<72 degrees. A vertical angle less than 72 degrees is not allowed. When the vertical angle $\alpha$ has a value of 90 to 72 degrees, the reflection occurs only twice. However, as described above, an $\alpha$ close to 90 degrees is not allowed.

An angle of vision, $\Phi$, to see just the entire lens for the light-receiving device 8 from any point in the inverted conical hole (angular aperture of the lens) limits the value of the angle $|4\beta-\pi|=|2\alpha-\pi|$, which is formed by the twice-reflected light ray DE in FIG. 7 and the −x-axis. It is required that $|2\alpha-\pi|>\Phi/2$. The value of $\Phi$ depends on the parameter of the module. For example, when $\Phi=30$ degrees is employed, this results in $\alpha<82.5$ degrees or $\alpha>97.5$ degrees.

When $\Phi$ is estimated as large as $\Phi=40$ degrees, this results in $\alpha<80$ degrees or $\alpha>100$ degrees. This is the upper limit of the angle of vision to see just the entire lens 7 for the light-receiving device from any point in the inverted conical hole. Therefore, for the vertical angle of less than 90 degrees, the allowable range of $\alpha$ is, with combining the earlier described condition for eliminating the three-time reflection, 72 degrees $<\alpha<80$ degrees.

For the limitation of the range of a larger than 90 degrees, it is necessary to consider the case of the once-reflected light ray. When a greater than 90 degrees further increases, the angle of twice reflection "$4\beta-\pi=2\alpha-\pi$" increases. However, in addition to that, the possibility of the once reflection is created. In the case of the once reflection, the angle formed with the −x-axis is $\angle BCD=\pi-2\beta=\pi-\alpha$ (see FIG. 7). This value must be more than one-half the foregoing angle of vision $\Phi$ to see just the entire lens 7 from any point in the inverted conical hole. The condition is written as $(\pi-\alpha)>\Phi/2$. This condition also depends on the value of $\Phi$. As the maximum, when $\Phi=40$ degrees, this results in $\alpha<160$ degrees. Therefore, the range of the vertical angle $\alpha$ greater than 90 degrees is 100 degrees $<\alpha<160$ degrees.

Figure 8:
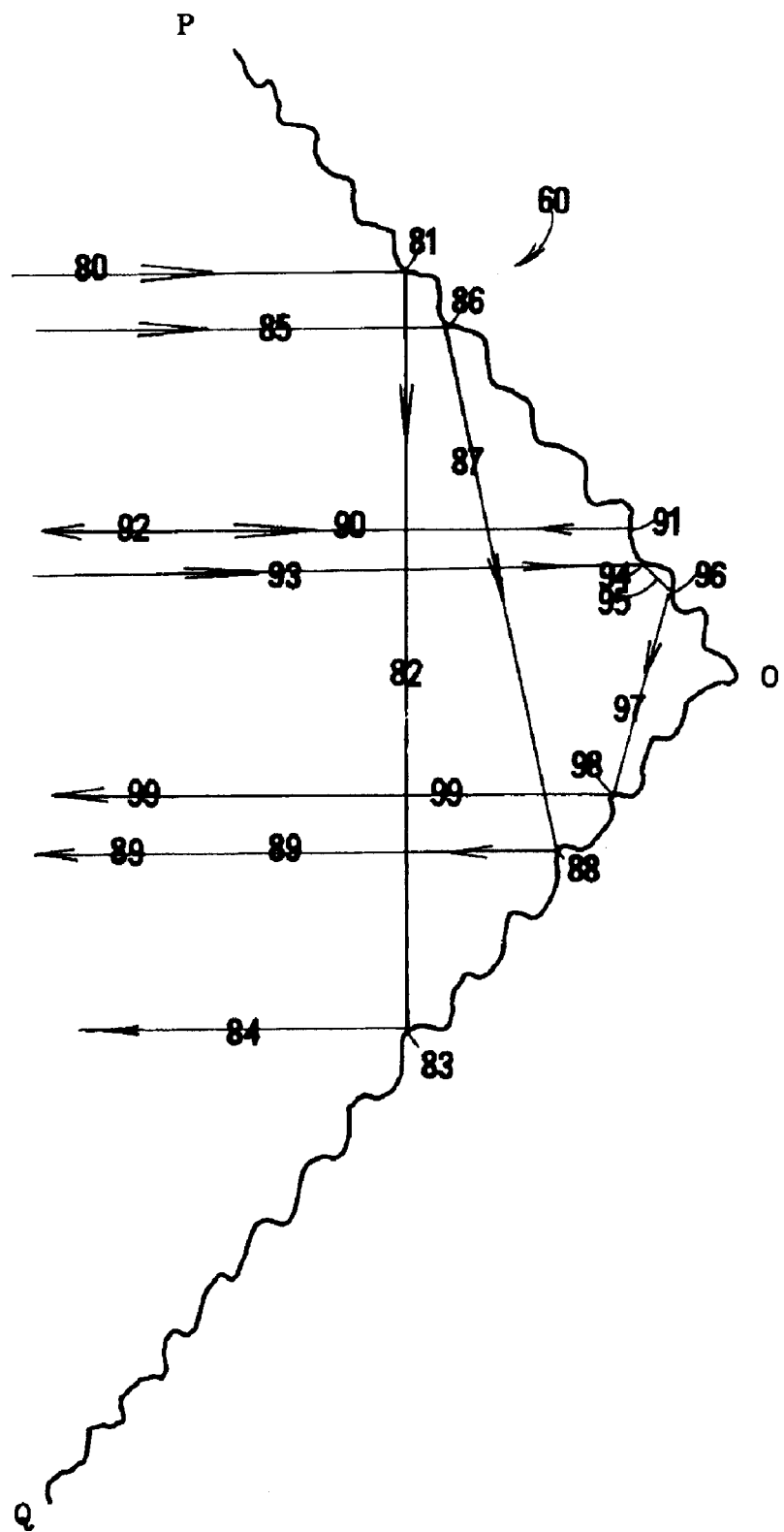
FIG. 8 is a diagram explaining that when the inverted conical hole has an uneven surface, a light ray along the axis has a possibility of being reflected in the precisely opposite direction, so that it may enter the light-receiving device to cause the crosstalk between the light-emitting device and the light-receiving device.

The above explanation is based on the assumption that the slanted face of the inverted conical hole is smooth. However, actually, because the hole is processed with a drill or the like, the surface cannot be said to be completely smooth. In this case, as shown in FIG. 8, irregular reflections exist, and some light rays may return in a direction to the light-receiving device.

It is assumed that the surface POQ of the inverted conical hole has unevenness. In FIG. 8, the unevenness is exaggerated. A light ray 80 parallel to the axis is reflected from a point 81 and becomes a primary reflection light ray 82. It is again reflected from a point 83 and becomes a secondary reflection light ray 84. Sometimes, the tangent of the points 81 and 83 forms an angle of precisely 45 degrees with respect to the axis. In this case, the secondary reflection light ray 84 is parallel to the −x-axis. It enters the light-receiving device.

Another light ray 85 parallel to the axis is reflected from a point 86 and becomes a primary reflection light ray 87. It is again reflected from a point 88 and becomes a secondary reflection light ray 89. When the tangent of the point 86 forms an angle of 90 degrees with the tangent of the point 88, the secondary reflection light ray 89 is parallel to the −x-axis and enters the light-receiving device.

Yet another light ray 90 parallel to the axis may hit a point 91 and become a primary reflection light ray 92, which returns over the same optical pathway. This phenomenon occurs when the tangent of the point 91 forms an angle of 90 degrees with respect to the axis.

Yet another light ray 93 parallel to the axis is reflected from a point 94 and becomes a primary reflection light ray 95. It is again reflected from a point 96 and becomes a secondary reflection light ray 97. It is further reflected from a point 98 and becomes a tertiary reflection light ray 99. When the summation of the tilt angles of the tangent of the points 94, 96, and 98 has an adequate value, the tertiary reflection light ray 99 becomes a light ray parallel to the −x-axis. It enters the light-receiving device.

As explained above, when the slanted face of the inverted conical hole 60 is roughened, various diffused reflections occur. As a result, light rays heading toward the light-receiving device are produced. What course of action is to be taken to prevent it? When the slanted face is completely smooth, the earlier described effect is produced. Therefore, it is essential only that the slanted face be close to smooth. It can be expected to achieve a good result when the processed surface is precisely finished to obtain a smooth surface.

It may be impossible to tell that when the surface is not smooth, the returning light rays (the light rays in a direction parallel to the −x-axis) always increase. As shown by the light rays 85, 87, and 89, when the two tangents form an angle of 90 degrees, the light ray returns toward the light-receiving device. Consequently, even when the exaggerated rough surface as shown in FIG. 8 is reduced in size without changing the relativity, a similar returning light ray is expected to occur. In other words, when a fractal relationship is established, without regard to the magnitude of the unevenness, a returning light ray having the same magnitude is expected to occur. It can be said that when the angle at the circumference of individual rough points, not the magnitude of the unevenness, is large, the number of returning light rays (the light rays in a direction parallel to the −x-axis) increases. However, no method is available to measure the angle at the circumference of individual rough points. No method is available to express it either. Consequently, the present inventor has decided to employ the surface roughness as the measure for estimating the returning light ray, although this approach may not be perfectly precise. When the surface roughness increases, the angle at the circumference of rough points is expected to increase. Inversely, when the surface roughness decreases, the angle at the circumference of rough points is expected to decrease. Although the two properties are not likely to be in a direct proportion, the present inventor believe that they have a correlation between them. Therefore, the present inventor consider that as the surface roughness increases, the number of returning light rays (the light rays in a direction parallel to the −x-axis) increases resulting from the first reflection, second reflection, third reflection, and so on as shown in FIG. 8.

Using a drill, an inverted circular conical hole was bored that has a vertical angle α=120 degrees and that has the slanted face having a length of 0.2 mm. Because the slanted face has a length of 0.2 mm, the diameter of the inverted conical hole was 0.34 mm. The diameter is much larger than the spread of the lightwave of the LD reflected from the filter. A large number of optical transmitter-receiver modules were produced that had an inverted conical hole having the above-described diameter and vertical angle and that were provided with a PD, LD, and filter. The crosstalk between the light-emitting device and the light-receiving device was measured. In addition, the surface roughness of the slanted face of the inverted conical hole was measured.

The surface roughness was measured by using a contact probe-type surface texture and contour-measuring instrument called SURFCOM 3000A made by Tokyo Seimitsu Co., Ltd. The tip of the contact probe was contacted to the surface of the object to be measured, and the probe was moved laterally to examine the up-and-down movement. The tip of the contact probe had a radius of curvature of R=0.08 μm.

The surface roughness was measured at an intermediate portion having a length of 0.15 mm in the slanted face (length: 0.2 mm) of the inverted conical hole. The obtained results were as follows:

When the surface roughness of the slanted face was Ra=0.7 μm or more, the crosstalk was −45 dB or more;

When the surface roughness of the slanted face was Ra=0.6 μm, the crosstalk was −54 to −57 dB; and When the surface roughness of the slanted face was Ra=0.1 to 0.2 μm, the crosstalk was −59 to −60 dB.

Consequently, when the crosstalk is intended to reduce to −47 dB or below, the surface roughness is required to reduce to Ra=0.6 μm or less. When the crosstalk is intended to reduce to −58 dB or below, the surface roughness is required to reduce to Ra=0.2 μm or less.

In addition, the application of black paint on the surface of the inverted conical hole can reduce the reflection. For example, it is desirable to use black polycarbonate resin or acrylonitrile-butadiene-styrene resin. Alternatively, it is also desirable to use black polyethylene, polytetrafluoroethylene, or polypropylene resin. Black frosting paint may also be applied.

Even when paint is applied, the surface must be smooth. As described above, the surface roughness is to be Ra=0.6 μm or less or Ra=0.2 μm or less.

EXAMPLE 1

An optical transmitter-receiver module in this example of the present invention is explained below by referring to FIG. 9. The module comprises an LD module at the bottom, an optical fiber at the upper portion, a PD module at the center-left position, and a block of a wavelength-selecting filter at the central portion.

A circular disk-shaped stem is provided with lead pins 202, 203, and 204. A monitoring photodiode 205 is fixed on a submount. An LD chip 3 facing upward is attached on the side face of a vertical pole 206. A cylindrical lens holder 207 holding a lens 4 is welded on the stem 200. A cylindrical LD sleeve 208 having an opening is welded on the stem 200 at the outside of the lens holder 207. This is the LD module.

A filter-holding sleeve 209 holds a wavelength-selecting filter 5. A center hole is provided with slanted faces having an inclination of 45 to 50 degrees, on which the wavelength-selecting filter 5 is fixed. An isolator 210 for preventing a returning light ray to the LD 3 is provided at the entrance of the center hole 213. An inverted conical hole 60 is provided at the back of the wavelength-selecting filter 5 in the center hole 213. This is a feature of the present invention. The LD sleeve 208 is welded on the bottom portion of the filter-holding sleeve 209. The filter-holding sleeve 209 is provided with a left-side opening 220 at the left-hand side. The left-side opening 220 is provided with a partition wall 221, to which a window 222 is fixed. The PD module is provided at the end face of the left-side opening 220.

The PD module comprises a circular disk-shaped stem 230, lead pins 231 to 233, a PD chip 8 attached to the center of the stem, a lens 7, and a lens holder 234 holding the lens 7. The lens holder 234 of the PD module is welded to the left-side opening 220 at the reflection side of the filter-holding sleeve 209.

The optical fiber 6 has a structure in which a core-cladding structure is covered with a covering 242. The covering at the end portion is removed to attach a ferrule 240. The ferrule 240 is held with a ferrule holder 243. The ferrule holder 243 is provided at its direct outside with a flexible bending limiter 244 for preventing excessive bending. The end face of the optical fiber 6 and the ferrule 240 is polished obliquely to prevent a returning light ray to the LD. The ferrule holder 243 is welded on the upper face of the filter-holding sleeve 209.

The incoming signal lightwave having travelled over the optical fiber 6 is reflected from the wavelength-selecting filter 5 and enters the PD 8 to be detected.

The outgoing signal lightwave emitted from the LD 3 passes through the lens 4 and the wavelength-selecting filter 5 and enters the starting end of the optical fiber 6. Part of the lightwave of the LD is reflected from the wavelength-selecting filter 5, bends the pathway 90 degrees, and enter the inverted conical hole 60. Because the inverted conical hole 60 is sufficiently smooth, the lightwave is reflected twice, arrives at a place remote from the lens 7, and disappears. Therefore, even when part of the lightwave of the LD is reflected from the filter 5, it does not enter the PD. As a result, the crosstalk between the LD and the PD is sufficiently suppressed.

Figure 9:
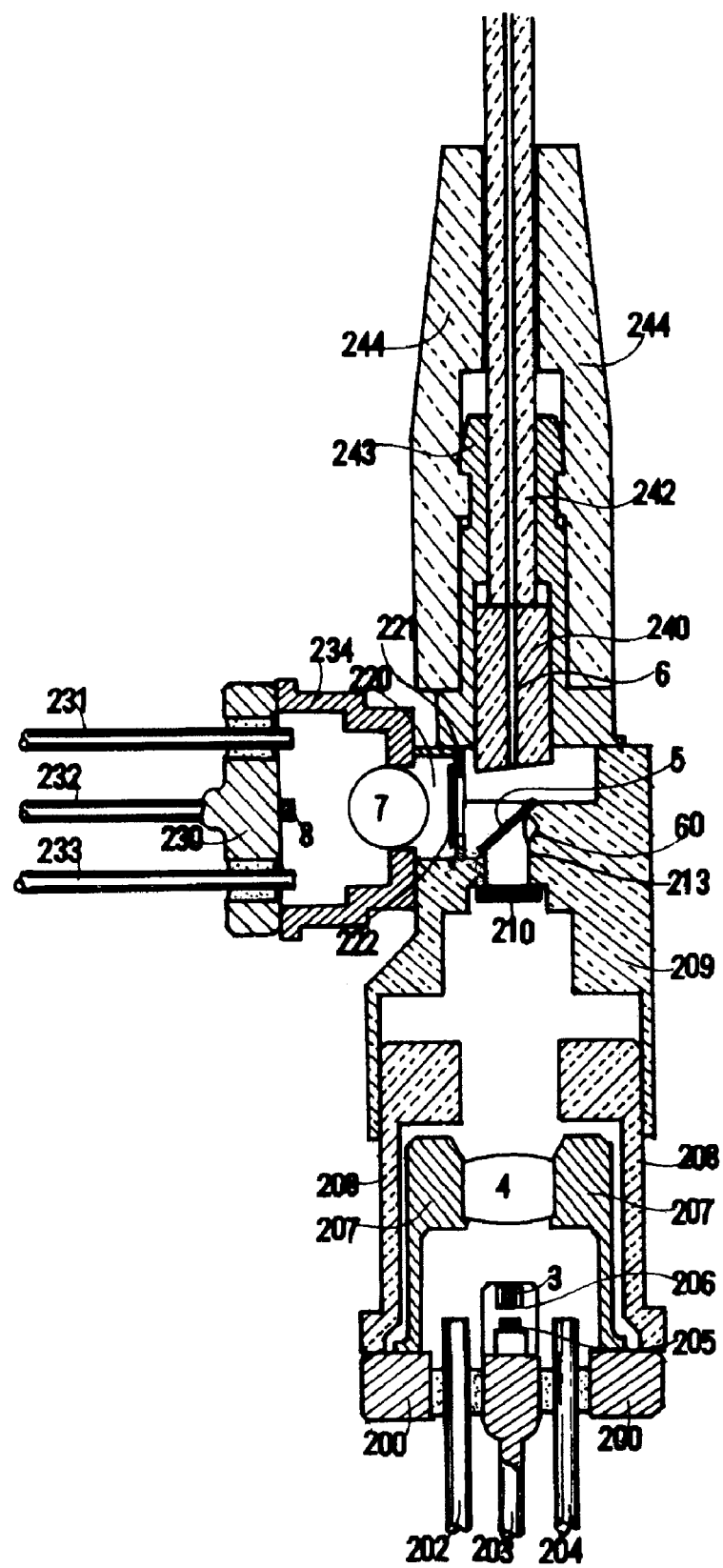
FIG. 9 is a vertical cross-sectional view of an optical transmitter-receiver module in an example of the present invention, in which the wall is provided with an inverted conical hole.

As shown in FIG. 9, an actual optical transmitter-receiver module has a structure in which an LD module, a PD module, and an optical fiber all housed in the individual packages are attached to a wavelength-selecting filter from three directions.

In Example 1 described above, the optical transmitter-receiver module has an optical fiber as a component. Nevertheless, the optical transmitter-receiver module may have as a component, in place of the optical fiber, a connector to which an optical fiber can be connected.

What is claimed is:

1. An optical transmitter-receiver module, comprising:
   (a) a wavelength-selecting filter;
   (b) an optical fiber for transmitting an optical signal bidirectionally;
   (c) a light-emitting device;
   (d) a light-receiving device into which a lightwave having travelled the optical fiber is introduced after it is reflected from the wavelength-selecting filter; and
   (e) a filter-holding sleeve that:
      (e1) holds the wavelength-selecting filter obliquely;
      (e2) holds the optical fiber attached at its one end wall;
      (e3) holds the light-emitting device at the end wall opposite to the end wall at which the optical fiber is attached; and
      (e4) has an inverted conical hole that:
         (e4a) is bored in a side wall at the position at which a lightwave of the light-emitting device arrives after it is reflected from the wavelength-selecting filter;
         (e4b) has a size larger than the spread of the lightwave of the light-emitting device having arrived at the inverted conical hole after it is reflected from the wavelength-selecting filter;
         (e4c) has a vertical angle, $\alpha$, of a value selected from the two ranges consisting of a range of 100 to 160 degrees and a range of 72 to 80 degrees; and
         (e4d) the inverted conical hole has a slanted face having a surface roughness, Ra, of 0.6 μm or less.

2. The optical transmitter-receiver module as defined by claim 1, wherein the inverted conical hole is a hole selected from the group consisting of an inverted circular conical hole, an inverted quadrangular pyramid-shaped hole, an inverted sexangular pyramid-shaped hole, and a groove-shaped hole.

3. The optical transmitter-receiver module as defined by claim 2, wherein the slanted face of the inverted conical hole has a surface roughness, Ra, of 0.2 μm or less.

4. The optical transmitter-receiver module as defined by claim 3, wherein the inverted conical hole is coated with black paint.

5. The optical transmitter-receiver module as defined by claim 2, wherein the inverted conical hole is coated with black paint.

6. The optical transmitter-receiver module as defined by claim 1, wherein the slanted face of the inverted conical hole has a surface roughness, Ra, of 0.2 μm or less.

7. The optical transmitter-receiver module as defined by claim 6, wherein the inverted conical hole is coated with black paint.

8. The optical transmitter-receiver module as defined by claim 1, wherein the inverted conical hole is coated with black paint.

9. The optical transmitter-receiver module as defined by claim 1, wherein the slanted face of the inverted conical hole is oriented to reflect a light ray, which is emitted from the light-emitting device and reflected by the wavelength-selecting filter, maximally twice before leaving the conical hole.

10. An optical transmitter-receiver module, comprising:
    (a) a wavelength-selecting filter;
    (b) a connector for holding an optical fiber for transmitting an optical signal bidirectionally;
    (c) a light-emitting device;
    (d) a light-receiving device into which a lightwave having travelled the optical fiber is introduced after it is reflected from the wavelength-selecting filter; and
    (e) a filter-holding sleeve that:
       (e1) holds the wavelength-selecting filter obliquely;
       (e2) holds the connector attached to its one end wall;
       (e3) holds the light-emitting device at the end wall opposite to the end wall to which the connector is attached; and
       (e4) has an inverted conical hole that:
          (e4a) is bored in a side wall at the position at which a lightwave of the light-emitting device arrives after it is reflected from the wavelength-selecting filter;
          (e4b) has a size larger than the spread of the lightwave of the light-emitting device having arrived at the inverted conical hole after it is reflected from the wavelength-selecting filter;
          (e4c) has a vertical angle, $\alpha$, of a value selected from the two ranges consisting of a range of 100 to 160 degrees and a range of 72 to 80 degrees; and
          (e4d) the inverted conical hole has a slanted face having a surface roughness, Ra, of 0.6 μm or less.

11. The optical transmitter-receiver module as defined by claim 10, wherein the inverted conical hole is a hole selected from the group consisting of an inverted circular conical hole, an inverted quadrangular pyramid-shaped hole, an inverted sexangular pyramid-shaped hole, and a groove-shaped hole.

12. The optical transmitter-receiver module as defined by claim 11, wherein the slanted face of the inverted conical hole has a surface roughness, Ra, of 0.2 μm or less.

13. The optical transmitter-receiver module as defined by claim 12, wherein the inverted conical hole is coated with black paint.

14. The optical transmitter-receiver module as defined by claim 11, wherein the inverted conical hole is coated with black paint.

15. The optical transmitter-receiver module as defined by claim 10, wherein the slanted face of the inverted conical hole has a surface roughness, Ra, of 0.2 μm or less.

16. The optical transmitter-receiver module as defined by claim 15, wherein the inverted conical hole is coated with black paint.

17. The optical transmitter-receiver module as defined by claim 10, wherein the inverted conical hole is coated with black paint.

18. The optical transmitter-receiver module as defined by claim 2, wherein the slanted face of the inverted conical hole is oriented to reflect a light ray, which is emitted from the light-emitting device and reflected by the wavelength-selecting filter, maximally twice before leaving the conical hole.

* * * * *